July 11, 1967  D. D. CAMPBELL  3,330,199
VEHICLE BODY VENTILATION SYSTEM
Filed April 29, 1965 2 Sheets-Sheet 1
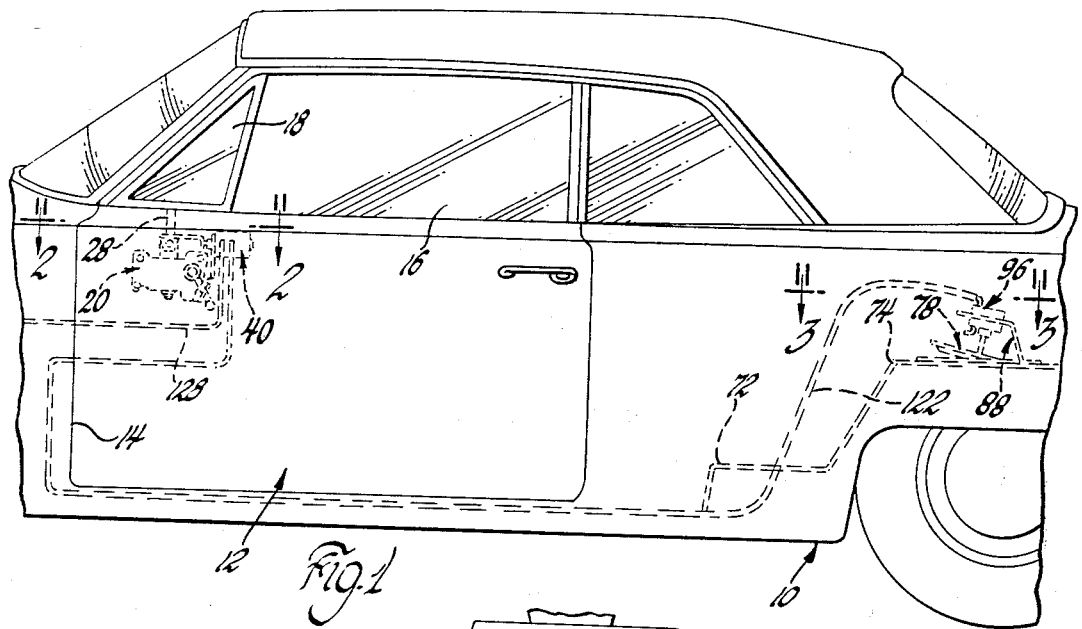
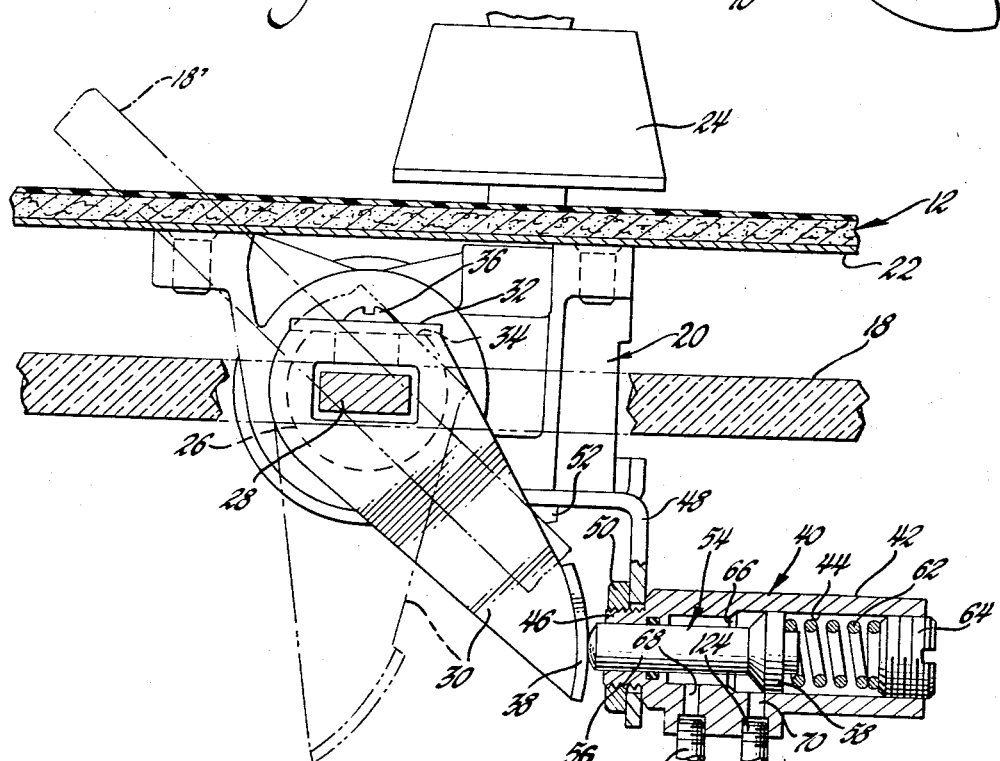
INVENTOR.
David D. Campbell
BY
*Herbert Furman*
ATTORNEY July 11, 1967  D. D. CAMPBELL  3,330,199
VEHICLE BODY VENTILATION SYSTEM
Filed April 29, 1965  2 Sheets-Sheet 2

INVENTOR.
David D. Campbell
BY
Herbert Furman
ATTORNEY

United States Patent Office 3,330,199
Patented July 11, 1967

3,330,199
VEHICLE BODY VENTILATION SYSTEM
David D. Campbell, Birmingham, Mich., assignor to General Motors Corporation, Detroit, Mich., a corporation of Delaware
Filed Apr. 29, 1965, Ser. No. 451,938
4 Claims. (Cl. 98—2)

This invention relates to ventilation systems for vehicle bodies and more particularly to an air exhaust means for vehicle bodies.

One feature of this invention is that it provides an improved air exhaust means for vehicle bodies. Another feature of this invention is that it provides an improved air exhaust means for vehicle bodies responsive to the position of a vehicle window. A further feature of this invention is that it provides an improved air exhaust means including a power actuated air exhaust valve and control means for the valve responsive to the position of a vehicle window.

These and other features of the invention will be readily apparent from the following specification and drawings wherein:

FIGURE 1 is a partial side elevational view of a vehicle body embodying an air exhaust means according to this invention;

FIGURE 2 is an enlarged partially broken away view taken generally along the plane indicated by line 2—2 of FIGURE 1;

Figure 3:
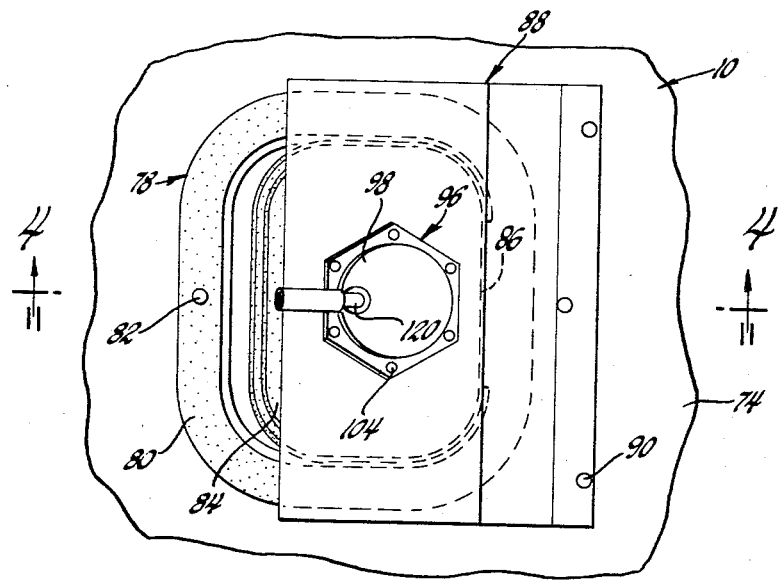
FIGURE 3 is an enlarged view taken generally along the plane indicated by line 3—3 of FIGURE 1.

Referring now to FIGURE 1 of the drawings, a vehicle body designated generally 10 includes a front door 12 which is hinged adjacent its forward edge 14 to the body for swinging movement between a closed position as shown and an open position, not shown. Door 12 conventionally mounts a vertically movable door window 16 and a swingable ventilation window 18, both of which are shown in closed positions. The window 16 moves within the door 12 to open position, and the window 18 swings about its generally vertically disposed axis to an open position, wherein the leading edge of the window is disposed inboard of the body and the trailing edge thereof disposed outboard of the body so that the window provides ventilation for the body.

The window 18 is moved between its open and closed positions by a manually operable drive arrangement or operating means designated generally 20. This drive arrangement is conventional and only the details thereof necessary to an understanding of this invention will be described. The drive arrangement 20, FIGURE 2, is mounted on the inner panel 22 of door 12 and includes a manually operable crank handle 24. The handle 24 drives a conventional reduction gear arrangement including a worm meshing with a spiral gear having a bored output shaft 26 which reecives and is secured to the lower pivot shaft 28 of the window 18 so as to move the window between its open and closed positions upon rotation of handle 24.

A valve actuating arm 30 seats on the end of the shaft 26 and has a depending flange 32 which seats against a flat 34 of shaft 26 and is secured thereto at 36. The arm 30 is provided with an opening which is aligned with the bore of the shaft 26 so as to receive the pivot shaft 28 therethrough. The other end of the arm includes a vertically disposed arcuate flange or tab 38 which actuates a a valve assembly or control means designated generally 40 when window 18 is in closed position. The valve assembly includes a valve body 42 provided with a stepped bore 44 therethrough. One end of the valve body includes a threaded reduced diameter portion 46 which fits within an opening in a bracket 48 and is secured to the bracket by a nut 50. Bracket 46 is bolted at 52 to the drive arrangement 20 to mount the valve assembly on the body. A valve member 54 disposed within the bore 44 includes a plunger portion 56 and a valve spool 58. A spring 62 seating between the valve spool and a threaded plug 64 in bore 44 biases the valve member 54 to the left to a position wherein a tapered annular shoulder of the valve spool 58 seats on a like shaped seat 66 of bore 44. When the window 18 is moved from its closed position to its open position 18' as shown in FIGURE 2, arm 30 moves with shaft 26 to its full line position as shown therein wherein the flange 38 of the arm engages the valve member 54 to move the valve member to the right against the action of the spring 62 so that the valve spool 58 unseats from the valve seat 66 to connect passages 68 and 70 of the valve.

Figure 4:
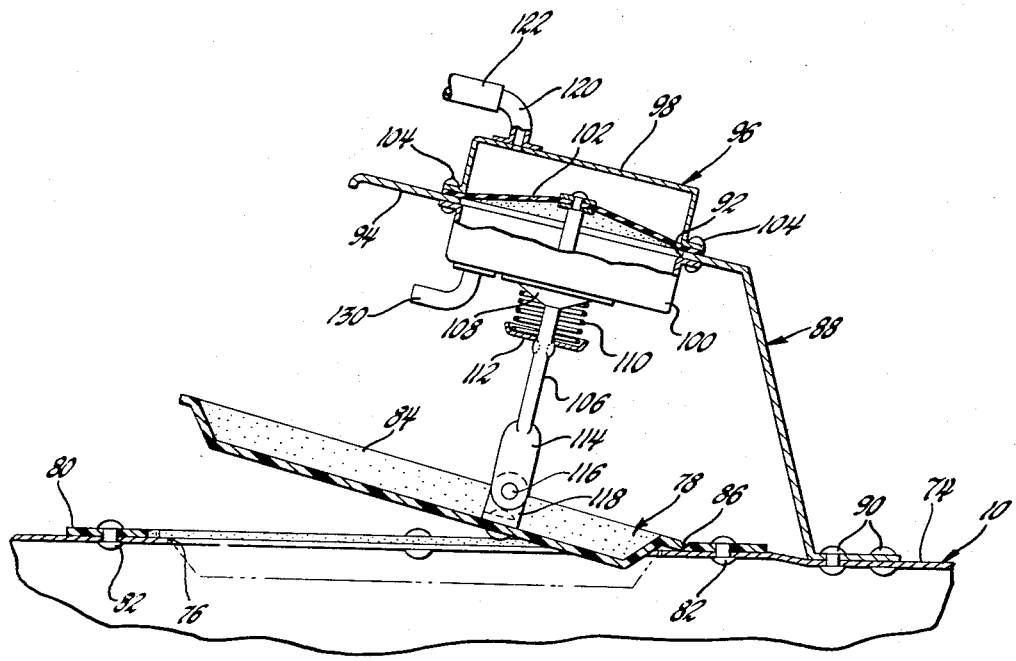
FIGURE 4 is an enlarged view taken generally along the plane indicated by line 4—4 of FIGURE 3.

Body 10 is of conventional structure and includes a floor pan designated generally 72 which includes a kickup panel portion 74 located generally in the rear axle area of the body. As shown in FIGURE 4, the kickup panel 74 is provided with an opening 76 which permits air to exhaust from the interior of the body to the exterior thereof when the opening is not closed. A valve assembly 78 is provided to selectively open and close the opening 76. The valve assembly includes a generally rectangular mounting portion 80 which is secured at 82 at a number of places to the kickup panel adjacent the opening 76. Formed integral with the portion 80 is a dished flap valve 84 which is integrally hinged thereto at 86. Preferably the valve assembly is formed of plastic material having integral hinge properties, such as polypropylene.

An offset angle bracket 88 is riveted at 90 to the kickup panel and includes a generally circular opening 92 in one leg 94 thereof. A vacuum motor 96 is secured to the leg 94 of the bracket 88 to move the valve 84 to open position as will be described. Motor 96 includes an upper flanged cup-shaped member 98, a lower flanged cup-shaped member 100, and an intermediate diaphragm 102 which is disposed between the flange of member 98 and the upper surface of leg 94. The flanges of members 98 and 100 and the edge portion of diaphragm 102 are riveted at 104 to the leg 94 adjacent the opening 92 therein. A piston rod 106 has one end thereof secured to the diaphragm 102 and extends outwardly of the lower wall of the member 100 through a conventional seal 108. A spring 110 seats between the seal 108 and a cup-shaped member 112 located on the rod 106 to bias the rod outwardly or downwardly of the motor 96. The other end of rod 106 includes a flattened portion 114 pivoted at 116 to an angle bracket 118 secured to valve 84.

Member 98 is provided with a valve stem 120 which is connected by a tube 122 to a valve extension 124 which is fixed within the passage 70, FIGURE 2. Another valve extension 126 fixed within the passage 68 is connected by a tube 128, FIGURE 1, with a suitable source of vacuum, such as the inlet manifold of the vehicle power plant. Member 100 of the motor 96 is provided with a valve stem 130 which opens to the atmosphere.

When the window 18 is in closed position, the passages 68 and 70 are connected since the valve member 54 is in its open position, as shown in FIGURE 2, and thus vacuum is applied to the upper chamber of the motor 96 so that the diaphragm 102 is pulled upwardly, as shown in FIGURE 4, to open the valve 84 and thereby provide an air exhaust from the interior of the car to the atmosphere. When the window 18 is in its open position 18', the passages 68 and 70 are disconnected, since the spool 58 is seated on seat 66, and the spring 110 will thereupon bias rod 106 outwardly of the motor 96 to move the valve 84 to its closed position within the opening 76.

Although the invention has been shown and described herein in conjunction with a swingable vehicle ventilation window, it will be understood, of course, that it can also be used in conjunction with the vertically movable ventilation window 16 by providing a suitable valve which is actuated by the window 16 when it moves to its closed position to connect the motor 96 to the source of vacuum and which disconnects the motor from the source of vacuum when the window is moved to a fully or partially open position.

Thus, this invention provides an improved ventilation system for vehicle bodies.

I claim:

1. The combination comprising, a vehicle body having a window opening therein for exhausting air from the interior of the body to the exterior thereof, a window movable between open and closed positions with respect to said opening, a second opening in said body for exhausting air from the interior of the body to the exterior thereof, a closure movable between open and closed positions with respect to said second opening, vacuum responsive operating means for moving said closure between open and closed positions, and means responsive to the position of said window for controlling said vacuum responsive operating means to move said closure between said positions to control the exhaustion of air from within the body through said window opening and said body opening.

2. The combination comprising, a vehicle body having a window opening therein for exhausting air from the interior of the body to the exterior thereof, a window movable between open and closed positions with respect to said opening, a second opennig in said body for exhausting air from the interior of the body to the exterior thereof, a closure movable between open and closed positions with respect to said second opening, vacuum power operating means for moving said closure between open and closed positions, and means responsive to the closed position of said window for energizing said vacuum power operating means to move said closure to said open position thereof to control the exhaustion of air from within the body through said body opening.

3. The combination comprising, a vehicle body having a window opening therein, a window movable between open and closed positions with respect to said opening, a second opening in said body, a closure movable between open and closed positions with respect to said second opening, motor means for moving said closure to the open position thereof, resilient means normally biasing said closure to the closed position thereof, and means responsive to movement of said window to the closed position thereof for energizing said motor means to move said closure to said open position thereof against the action of said resilient means.

4. The combination comprising, a vehicle body having a floor pan and a window opening in a wall thereof to exhaust air from within the body, a window movable between open and closed positions with respect to said opening, a second opening in said body floor pan to exhaust air from within said body, a closure movable between open and closed positions with respect to said second opening, and means for selectively opening said window and closing said closure or alternately closing said window and opening said closure to selectively provide an air exhaust for said body through said window or through said floor pan.

References Cited

UNITED STATES PATENTS

| | | | |
|---|---|---|---|
| 2,096,577 | 10/1937 | Drake | 98—2 |
| 2,573,419 | 10/1951 | Emery | 98—2 |
| 2,641,501 | 6/1953 | Ensey | 98—2.2 |

MEYER PERLIN, *Primary Examiner.*